May 27, 1941.　　　C. M. ROAN ET AL　　　2,243,472
SIGNALING SYSTEM FOR VEHICLES
Filed Jan. 20, 1939　　　7 Sheets-Sheet 1

Inventors
Carl M. Roan
Oliver E. Kaupang
Arthur W. Rohlen
By their Attorneys
Merchant & Merchant May 27, 1941.   C. M. ROAN ET AL   2,243,472
SIGNALING SYSTEM FOR VEHICLES
Filed Jan. 20, 1939   7 Sheets-Sheet 6

Inventors
Carl M. Roan
Oliver E. Kaupang
Arthur W. Rohlen
By their Attorneys

Patented May 27, 1941

2,243,472

UNITED STATES PATENT OFFICE 2,243,472

SIGNALING SYSTEM FOR VEHICLES

Carl M. Roan, Oliver E. Kaupang, and Arthur W. Rohlen, Minneapolis, Minn., assignors to Beacon Safety Signal Co.

Application January 20, 1939, Serial No. 251,930

7 Claims. (Cl. 177—329)

Our present invention relates to improvements in vehicle signaling systems and to improvements in indicating devices for vehicles.

Among the several important objects of the invention is the provision for an improved vehicle signaling system by means of which the operator of a vehicle may quickly and conveniently indicate to drivers of other vehicles, approaching preferably from the rear or front, his intentions to turn either to the left or right to stop or to commit some other act which requires temporary blocking of the highway.

In the preferred embodiment of the invention herein illustrated the system incorporates independent left and right turn indicators located at opposite side portions of the vehicle body in such positions as to be visible from both the rear and front of the vehicle. These left and right hand turn indicators are electrically operated by remote control, and are of the projectable and retractable signal arm type. Each of these indicators includes an independent control switch located within a convenient reach of the vehicle operator. These control switches are so arranged, one relative to the other, that they may be selectively operated singularly or simultaneously by different fingers of one of the operator's hands. With this arrangement, when the operator contemplates a left or right hand turn, he can indicate his intentions to both rearwardly approaching and on-coming traffic by selective independent operation of the control switches of a left or right hand indicator. Also, with this arrangement, when the operator contemplates an abrupt stop or the committing of some other act which requires temporary blocking of the traffic approaching either from front or rear or both, he may indicate his intentions by simultaneous manipulation of the switches of both left and right hand turn indicators, with different fingers of the same hand.

It will, of course, be appreciated that signaling systems of this character are provided as a safety measure and that the very essence of safety lies in the ability of the operator to accurately transmit his intentions to operators of other vehicles with the least possible time lag. It was to accomplish this purpose that the control elements of the indicators were located within convenient reach of one of the operator's hands and were so spaced that the individual control elements could be operated either singularly or simultaneously by the fingers of one hand, as above stated. However, a long series of practical experiments have proven that this ideal arrangement, unless combined with some suitable aid to location and indentification by feel, presents a serious traffic hazard in that the operator will often lose so much valuable time in fumbling around locating and properly identifying the control elements and determining the existing conditions that the usefulness of the ultimately transmitted warning signal is lost; and a further and even more serious hazard result from frequent misidentification of the control elements and consequent wrong operation thereof with the result that an undesired and entirely misleading signal is given.

Hence, it is a particular object of the instant invention to provide means whereby the operator can instantly and without sight locate and distinguish between the indicator control elements and determine the operative or inoperative position of each of the indicator elements. In accordance with the preferred embodiment of the invention herein illustrated, this last stated objective is very satisfactorily attained by so spacing the finger-engaging portions of the opposite control elements that they can be conveniently spanned by the thumb and little finger of one hand and operated one by the thumb and the other by the little finger of that hand, and then providing in association with these indicator control elements, a locator ledge or shelf of considerably greater area then the finger-engaging portions of the control elements and bearing such spaced relation thereto that when the middle three fingers of the operator's hand are placed thereon, the thumb and little finger will be properly positioned for manipulation of their respectively operated control elements.

This locator ledge or shelf, being of much greater area than the finger-engaging portions of the control elements, is very easily located and when the operator's fingers are brought to bear thereon, he is definitely assured of properly identifying a desired control element, since, when his fingers are placed on this ledge, his thumb will be positioned only for operation of the thumb operated control element and the little finger will be positioned only for operation of the little finger operated control element. Furthermore, being that the shelf or ledge is a relatively fixed or stationary part, the operator will always be able to determine the operative or inoperative position with respect to the locator ledge or shelf.

Exhaustive tests in the field have conclusively proven that the locator shelf or ledge greatly reduces the time element required to locate the indicator control elements and substantially eliminates the great traffic hazard of incorrect or unduly delayed warning signals. While the indicator shelf or ledge is particularly important and has been herein described in connection with a pair of indicator control elements, it is also important in combination with a single control element, and the application of the principle to a signaling system comprising only one indicator and control element is also believed to be broadly new.

Another important object of the invention is the provision of an overload cut-out, which, in case the electrically operated signal arm of an indicator becomes stuck by reason of elements such as sleet or otherwise, will automatically interrupt the circuit or circuits after a predetermined length of time, and thereby prevent possible, and in fact likely, burning out of or serious injury to the electric elements of the device.

Another important object of the invention is the provision of an overload cut-out device of the kind described which also incorporates simple and efficient means for indicating to the driver the interrupted condition of the circuits.

The indicators of the multi-purpose indicating system herein illustrated are of the vertically pivoted signal arm type in which the signal arms are normally retracted to an inoperative position, wherein they are disposed substantially parallel to a side of the vehicle body and the line of movement of the vehicle, and are pivotally movable from such inoperative positions to and from operative position, wherein they project substantially at right angles to the side of the body and the line of movement of the vehicle.

Of course, when the signal arms are projected to their operative positions, wherein they extend outward from the side of the vehicle body, they are apt to come into contact with relatively moving objects which will tend to move the same pivotally in one direction or the other. In mechanisms of this character it has been previous practice to so construct the same that the signal arms would be positively limited to pivotal movements within the normally operating range, usually about 90° of pivotal movement, with the result that accidental application of extraneous forces such as caused by side-swiping of another vehicle or stationary object in a direction tending to extend the signal arms beyond their normally extended maximum positions, results in great damage if not total destruction of the mechanism.

Hence, a very important object of the present invention is the overcoming of this last stated objectionable characteristic of the pivoted signal arm type of mechanism, and to this end the improved signal mechanism herein illustrated and described is provided with yielding stop devices for the signal arms which, under all normally encountered pressures tending to extend the signal arms beyond their normal maximums, limits projecting movements of the signal arm to that predetermined maximum, but which stops will yield and permit continued pivotal movements of the signal arm beyond their normally extended maximum positions under abnormally great pressures, less, however, than is required to damage the signal arms or their projecting mechanisms. With this yielding stop provision incorporated, the life of the mechanism is greatly extended.

The above noted and other highly important objects and advantages of the instant invention will be made apparent from the specification, drawings and claims.

In the accompanying drawings, like characters indicate like parts throughout the several views.

Referring to the drawings.

Figures 1, 2, 19, 20, 21:
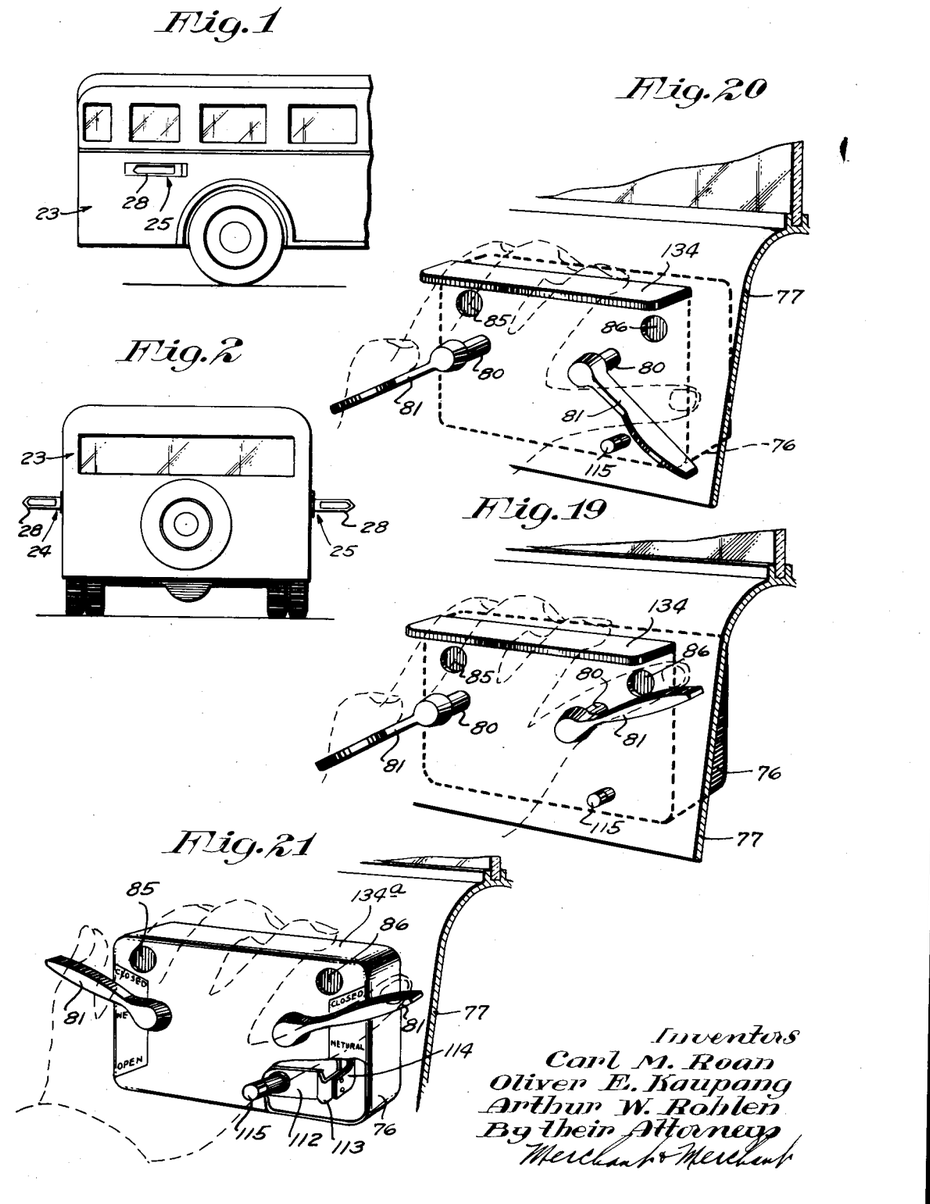
Fig. 1 is a view in side elevation of a vehicle, in the nature of an automotive bus, incorporating the signaling system and indicators of the invention, the signal arm of the single indicator therein illustrated being shown in retracted position.
Fig. 2 is a view in rear elevation of the automotive bus of Fig. 1 and illustrates like indicators of the invention applied to opposite sides of the vehicle and with the signaling arms of the indicators in their extended signaling positions.
Fig. 19 is a view particularly illustrating the control elements of the pair of indicators of the system and their associated locator ledge or shelf, one of said control elements being shown in signal arm extended position and the other thereof in a signal arm retracted position.
Fig. 20 is a view similar to Fig. 19 but illustrating both of the control elements in their signal arm extended positions.
Fig. 21 is a view similar to Figs. 19 and 20 but illustrating a slightly modified arrangement.

In Figs. 1 and 2 the automotive vehicle in the nature of a passenger bus is indicated as an entirety by the numeral 23. It should, of course, be understood that the bus is merely illustrative of one of several kinds of vehicles to which the system and signal device thereof may be advantageously applied.

As previously indicated, the signaling system of the invention does in its preferred form herein illustrated, include two like signaling devices. These like signaling devices are preferably located on opposite sides of the vehicles near the rear thereof, and the one located on the left hand side, and which is adapted to serve individually as a left hand turn indicator, is indicated as an entirety by 24; and the one thereof that is located on the right hand side of the vehicle, and which is adapted to serve individually as a right hand indicator, is indicated as an entirety by the numeral 25. The shell-like casings of these indicators are indicated by the numeral 26 and are provided at their outer longitudinal faces with large openings 27 that are shaped to correspond to the profiles of the signal arms 28. The backs or inner sides of the casings 26 are formed completely open but are normally closed by cover plates 29 shown only in Fig. 9. These cover plates are adapted to be removably held in place by suitable anchor screws or the like, not shown, that are passed through aligned apertures in the cover plates 29 and in anchoring flanges 30 that are formed integrally with the ends of the casings 26.

Preferably and as illustrated, the signaling devices 24 and 25 are recessed into the body and anchored in the manner taught in our Patent Number 2,183,622, which was issued from a copending application on December 19, 1939.

Since the two signaling devices are alike, only one thereof has been illustrated in detail and will be specifically described, and like reference characters will be assigned to like parts of both indicators in so far as both are illustrated. The signal arm 28 is very similar to that illustrated in our co-pending application Serial Number 61,300, filed January 29, 1936, and comprises a heel block 31 that is preferably cast of suitable material such as aluminum, a longitudinal U-shaped frame 32, and translucent or transparent side plates 33. The U-shaped frame 32 is detachably secured to the heel block by screws or the like 34. Suitably mounted within the signal arm is a pair of incandescent light bulbs 35. The side plates 33 may be of any desired color, but preferably the one of the side plates which faces forwardly when the signal arm is projected will be tinted yellow, and the one thereof which faces rearwardly when the signal arm is projected will be tinted red.

For securely, but pivotally, anchoring the signal arm 28 to the casing, the heel block 31 is rigidly formed at its blunt end portion with a hinge lug 36 that is interposed between hinged lugs 37 on the outer face of the casing. Extending vertically through the aligned lugs 36 and 37 is a hinge pin 38.

As a reversible motor means for moving the signal arm to and from operative position, we preferably employ a combination spring and solenoid motor, the spring being indicated by 39 and the solenoid by 40. The spring 39, which maintains the signal arm under yielding tension to retract within the casing and to hold the same against accidental displacement from the casing, is anchored at one end to the casing at 41, and at its other end the spring 39 is anchored to the heel block 31 of the signal arm at a point off-set from the hinge pin 38 at 42. An anchoring pin 43 extends through the hollow heel block and a movable end of the spring 39 is looped therearound.

The solenoid 40, which is equipped with a magnetically influenceable armature bar 44 and serves the purpose of extending the signal arm against the yielding action of the spring 39, is preferably wound flat on a guide sleeve 45 of non-magnetic material such as brass or copper, and the armature bar 44 works slidably in this sleeve 45 and is thereby guided for true axial movements. The guide sleeve 45 extends nearly from end to end of the casing 26, and by means of suitable mounting brackets 46 is rigidly anchored to the casing. At its under surface the sleeve 45 is provided with a wide longitudinally extended slot 47. The end portion of the armature bar 44 which projects outward of the solenoid coil 40 is operatively connected to the heel block of the signaling arm at a point off-set from the vertical pivot by an operating linkage including a link 48. This link 48 is pivotally connected to a lug 49 of the signal arm heel block at 50, and at its other or opposite end the link 48 is pivotally connected to a push arm 51 that is anchored fast to the armature bar 44 within the slot 47 by stud bolts or the like 52. The pivotal connection between the link 48 and push arm or bar 51 is provided by means of a pin 52a that is rigidly anchored to the end of the push arm 51 and works in a slot 53 in the link 48. This slot and pin connection permits fixed pivotal movement of the signal arm beyond its normal maximum extended position without damaging the operating linkage, but free movement of the pin in the slot under normally encountered forces is prohibited by means of a spring 54 that is anchored at one end to the link 48 and at its other end to the pin 52a.

At its intermediate portion the link 48 is provided with an out-turned lug-acting flange 55 working through which, for limited axial sliding movements, is a plunger rod 56 of a dash pot 57. The plunger rod 56 carries a piston-acting plunger 58 that works within the dash pot 57. The dash pot 57 is closed at one end by a plug-like head 59 that serves as a guide bearing for the plunger rod 56, and at its other end the dash pot is closed and is pivotally anchored to the casing at 60. For limiting axial sliding movements of the plunger rod 56 through the lug 55 of the link 48, said plunger rod is provided at opposite sides of said lug 55 with spaced stop collars 61. The dash pot and associated connections just described cushion movements of the signaling arm when it approaches its normal extreme open or closed position, and the stops 61 are so adjusted that the signal arm will move freely and unaffected by the dash pot during initial opening or closing movements.

As in the structure disclosed in our Patents Number 2,155,617, of April 25, 1939, and Number 2,144,813 of January 24, 1939, this signal mechanism is provided with a shutter 62 that is located within the casing and is arranged to automatically close the signal arm aperture 27 when the signal arm is extended. This shutter is substantially like that shown in my above referred to co-pending applications, and is formed of flat sheet material and is pivotally connected at one end to the signal arm heel block 31 at 63. At its other end the shutter 62 is pivotally connected at 64 to a guide arm 65. The guide arm 65 is pivotally connected at its other end to the casing through the medium of suitable mounting lugs 66 and pivot pin 67. The arrangement described is such that the shutter will be automatically positioned flat against the inner face of the signal arm when the signal arm is in its completely retracted inoperative position and will move outwardly flat against inner face of the casing and over-lap the edges of and completely close the signal arm aperture 27 when the signal arm is extended. For the purpose of maintaining a light yielding pressure on the shutter 62 when it is in either of its extreme positions, there is provided on the pivot pin 67 between spaced mounting lugs 66, a light coil spring 68. When the signal arm is in its closed or retracted position, the marginal flanges 69 thereof over-lap the edges of the casing and seal the interior of the casing against the elements; whereas, the above described shutter serves this purpose when the signal arm is extended.

For controlling the circuit of the light bulbs 35 of the signal arm there is provided a switch comprising a contact 70 that is carried by but electrically insulated from the signal arm heel block 31, and a more or less segmental shaped leaf spring contact 71. The leaf spring contact 71 is free for resilient action at one end and at its other end is anchored to the end of the signal arm casing but is suitably electrically insulated from said casing. The arrangement between the contacts 70 and 71 is such that the contact 70 is disengaged from the contact 71 when the signal arm is fully retracted, but comes into frictional wiping engagement with the spring contact 71 when the signal arm is partially extended and thereafter maintains frictional engagement with the spring contact during its balance of the outward projecting movements of the signal arm, so as to keep the circuits of the bulbs closed during the interval the signal arm is in operative position.

One side of the filament of each of the light bulbs 35 is grounded to the casing of the device through the medium of the signal arm and the other side of the filament of each of said light bulbs 35 is connected by a lead 72 to the heel contact 70. Interposed in the lead 72 at a point between the inner and outer of the light bulbs 35 so as to be effective only on the latter is a conventional type of thermally actuated flasher switch 73. The balance of the circuit of the light bulbs 35 will be made clear in connection with the description of the wiring diagram of Fig. 22.

Figure 22:
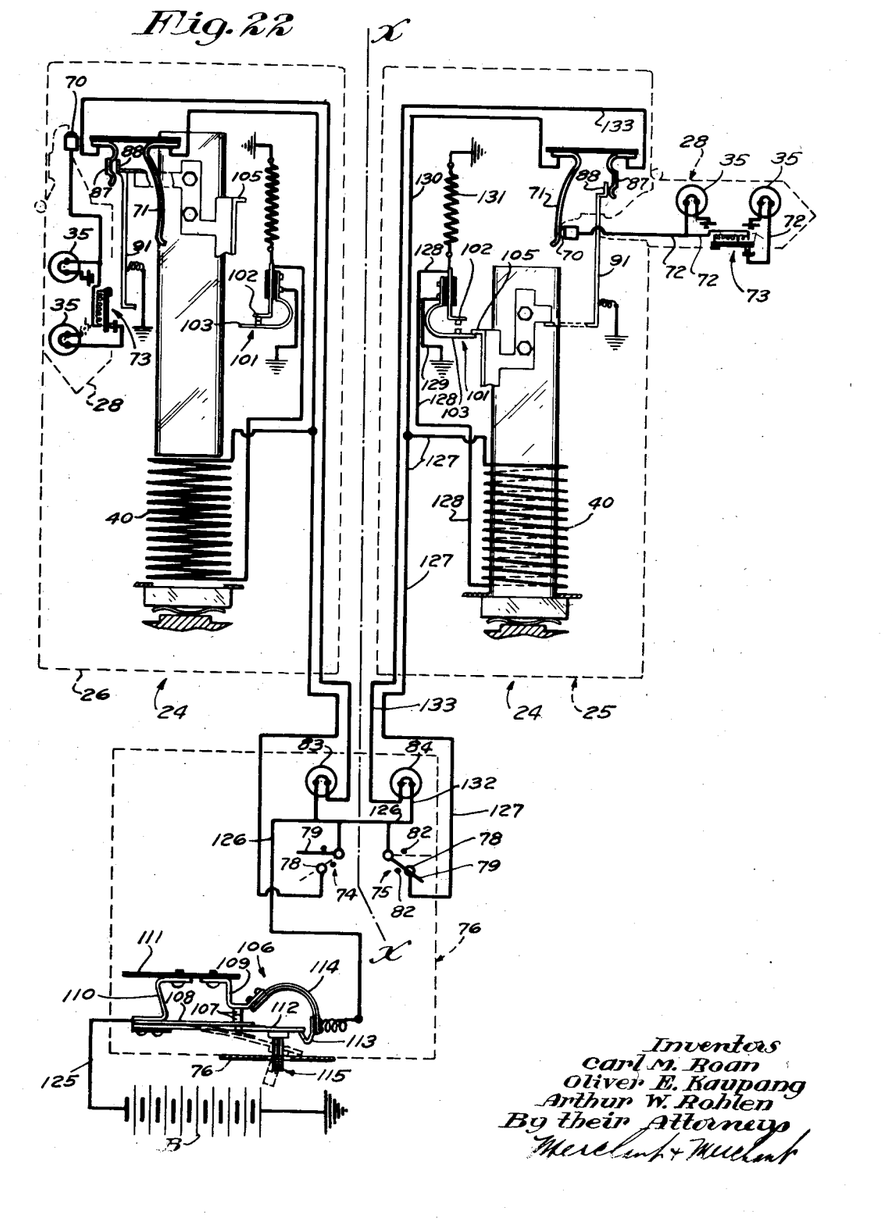
Fig. 22 is a diagrammatic view illustrating the preferred electrical hook-up of a pair of indicators and the control mechanism therefor.

For manually controlling operation of the signaling devices 24 and 25, there is provided a pair of like manual control switches shown diagrammatically in Fig. 22, and indicated by the numerals 74 and 75, respectively. These switches are preferably contained within a common control box 76, which control box will be assumed to be in the operator's compartment. In Figs. 19 and 20 the control box is illustrated as being located just back of the vehicle's instrument panel 77, and in Fig. 21 this control box is indicated as being mounted on the inside face of the control panel 17.

The switches 74 and 75 each comprise a fixed contact 78 and a pivoted switch arm 79. Since these switches 74 and 75 are conventional in character, they are shown only diagrammatically in Fig. 22 and it may suffice to say that the switch arms 79 thereof are mounted on journaled control shafts 80 that project through the inner face of the control box 76, and are provided at their outer ends with control elements or levers 81. Obviously in the arrangement shown in Figs. 19 and 20, the control shafts 80 extend through the instrument panel 77 as well as the face of the control box.

Figures 13, 16:
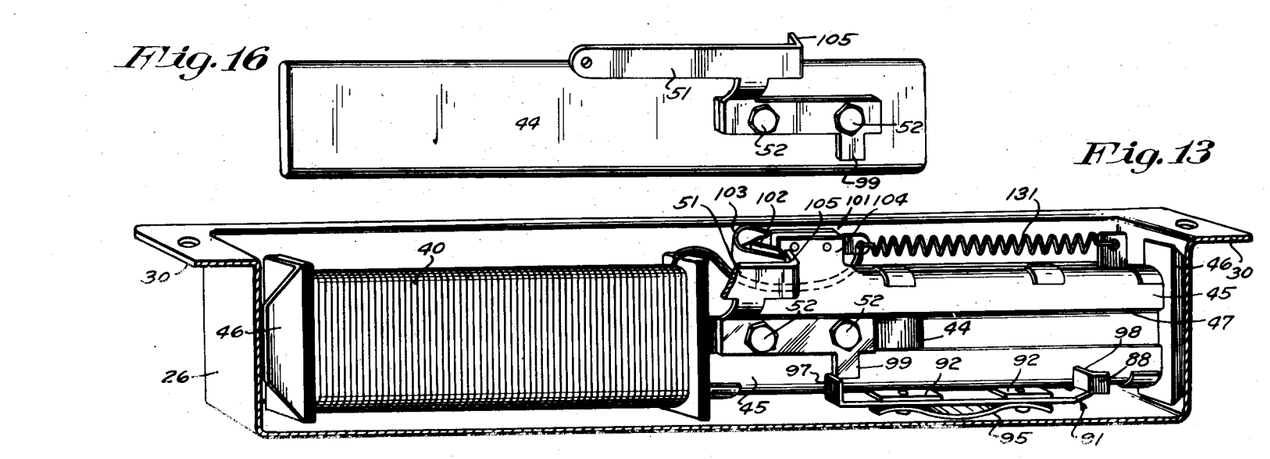
Fig. 13 is a sectional view in perspective taken approximately on the line 13—13 of Fig. 4.
Fig. 16 is a detail perspective view of the armature and part of its signal arm operating linkage.
Figure 14:
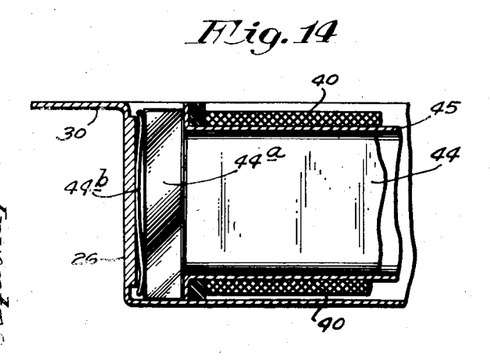
Fig. 14 is a detail view sectioned on the line 14—14 of Fig. 4.
Figure 15:
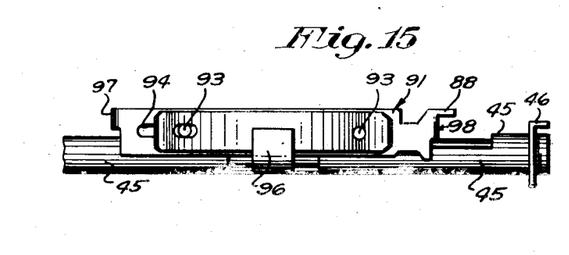
Fig. 15 is a fragmentary detail view taken approximately on the line 15—15 of Fig. 13.

For positively limiting the zone or range of movement of the switch arms 79 and their respective operating levers 81, there are provided spaced switch arm stops 82. Also contained within the control box 76 are pilot light bulbs 83 and 84 that are visible to the driver through windows 85 and 86 respectively in the control box 76. Of course, in the arrangement shown in Figs. 19 and 20 these windows must be made visible through aligned apertures in the control panel. The pilot light 83 and switch 74 serve for the left hand indicator and the switch 75 and pilot light bulb 84 serve for the right hand indicator. For automatically controlling operation of the pilot lights 83 and 84 the signaling devices are each provided with a switch made up of yielding fixed contacts 87 and a grounded sliding contact 88. The spring contacts 87 are mounted fast at one end to the end of the casing 26 through means including a mounting screw 89 and insulating block 90 (see particularly Fig. 17). The sliding or movable contact is formed as part of a slide bar 91 that is carried by the mounting sleeve 45 for limited sliding movements longitudinally of the guide sleeve by means including mounting brackets 92 (see particularly Fig. 13) and pins 93 rigidly projecting from said brackets 92 and which work in longitudinal slots 94 in the slide bar. The bars 91 are retained against accidental displacement by the pins 93 and are retained against accidental longitudinal sliding movement by a leaf-pressure spring 95 that works over the projected ends of the pins and is pressed toward the slide bars by means of a retaining flange or bracket 96 that rigidly projects from the guide sleeve 45. At its opposite end portion the slide bar 91 is provided with lugs 97 and 98 that are alternately engaged by a lug 99 projecting from the armature anchored portion of the push arm 52 (see particularly Figs. 13 and 16). The slide bar lug 97 is engaged by the armature bar lug 99 just prior to final signal arm extending movements of the armature bar and is moved therewith for a sufficient distance to close the switch contacts 87 and 88. The slide bar lug 98, on the other hand, is engaged by the armature bar lug 99 just prior to final signal arm retracting movements of the armature bar and is moved with the armature bar a sufficient distance to open the switch contacts 87 and 88 by the time the signal arm is fully retracted.

Attention is here called to the fact that although the switch contacts 87 and 88 are not closed until the signal arm reaches its substantially fully extended position, they remain closed during the major retracting movements of the signal arm, and are opened only when under final closing movements of the signal arm.

As will hereinafter be noted, there are two circuits for the solenoid 49, one of these being hereinafter described as a low resistance or high power circuit, and the other being referred to as a high resistance or low power circuit. The said low resistance high power circuit is closed manually by the operator and causes extension of the signal arm. However, this circuit is automatically broken and the low power or high resistance circuit made operative simultaneously therewith when the signal arm reaches its maximum extended operative position. The low power circuit energizes the solenoid sufficiently to insure holding of the signal arm in its extended position against the retracting action of the spring 39, and other normally encountered forces such as wind and vibration, but produces less drain on the potential source, usually the vehicle's storage battery, and heats the electric elements of the circuit much less than the high power circuit. The low power circuit therefore may be considered as a holding circuit and the high power circuit as the operating circuit.

In practice it is desirable that the signaling arm extending motor, during the signal arm extending operation, have a power factor greatly in excess to that normally required to extend the signal arm so as to safe-guard against the likelihood of sticking of the signal arm in a closed position under great wind pressure, sleet formations and the like. In the arrangement herein described, we accomplish this result by dissipating a relatively very great amount of electric energy for only such a brief period as is necessary to normally extend the signal arm, and which period is so brief as not to materially discharge the vehicle's battery or seriously heat up the electrical elements of the circuit which are greatly overloaded for this brief period.

For the purpose of automatically effectively switching from the low resistance high power circuit to the high resistance low power circuit coincidentally with the extension of the signal arm, we provide a switch 101. This switch 101 comprises a fixed contact 102 and a spring contact 103 that is biased to normally be closed with the contact 102. The contacts 102 and 103 are mounted on but suitably insulated from a mounting flange 104 that projects rigidly from the guide sleeve 44. For automatically separating the contacts 102 and 103 to thereby open the switch when the signal arm reaches its fully extended operative position, there is provided on the armature bar push arm, a switch operating flange 105 that engages the projecting end of the spring contact 103 just in advance to the completion of the movement of the signal arm to its maximum extended position.

As an important feature of the invention, we provide an overload cut out and indicating device, which, preferably and as illustrated, is in the nature of a thermally responsive overload cut out switch 106. In carrying out this phase of the invention, this overload cut out device is preferably located within the control box 76, but at any rate should be located within convenient reach and vision of the operator, and is preferably made common to the indicators 24 and 25. The overload cut out switch 106, as illustrated, includes co-operating normally closed contacts 107. One of these switch contacts 107 is carried by the free end of a spring switch arm 108, and the other of said contacts 107 constitute a fixed contact and is carried by a supporting bracket 109. At the end opposite its contact 107, the spring switch arm 108 is anchored to the mounting bracket 110. The brackets 109 and 110 are suitably mounted on a mounting panel 111 of suitable insulating material. The entire cut-out switch 106 may be assumed to be mounted in the control box through the medium of this panel 111. The spring switch arm 108 is self-spring-biased in a direction tending to move the contact equipped end thereof away from the co-operating fixed contact 107, but said spring arm 108 is normally latched or locked in a circuit closed position as illustrated in Fig. 22 by a thermally responsive latch mechanism consisting of a resilient latch arm 112, a hook-like latch dog 113 and a bi-metallic latch dog actuator 114. The latch arm 112 is anchored at one end to the mounting bracket 110 in common with the spring switch arm 108. The latch dog 113 is carried by the free end of the actuator 114, which in turn, is fixedly anchored to the projected end of the bracket 109. As will be hereinafter made apparent, the switch contacts 107 are connected in series with the signal arm operating solenoid through the actuator 114, which actuator is of thermostatic bi-metal, and in case the signal arm fails to move under energization of the solenoid 40, will heat up by unduly prolonged current drain therethrough and will warp outwardly with respect to the free end of the latch arm 112 until the latch dog 113 thereof releases the free end of the latch arm 112, and permits the self-outwardly-biased switch arm 108 to move outwardly and break the circuit through the contacts 107, thereby rendering all of the circuits of the device inoperative and preventing undue heating and possible breaking down of the electric elements.

For the purpose of resetting the overload cut out and indicating to the operator of the vehicle the inoperative condition of the signaling circuit, the latch arm 112 is provided near its free end with a resetting and indicating pin 115 that projects loosely through the face of the control box 76, as is best shown in Figs. 20 to 22, inclusive. This plunger acting pin 115 preferably is of insulating material so that there will be no possibility of short circuit with the control box if the latter be of metal. Preferably this pin 115 is made of two colors, the portion thereof that is normally within the control box being red and the portion that is normally projecting outward of the control box and which is the only portion normally visible to the operator is preferably black. It is, of course, difficult for the operator to determine the condition of the signaling system by the actual distance the reset plunger or pin 115 projects through the control box, but when the two color arrangement described is employed, part of the red portion of the reset plunger 115 will be clearly visible as soon as the plunger becomes extended as a result of breaking of the thermally actuating switch mechanism described. Of course, resetting is effected by merely pressing inwardly upon the plunger 115 after the bi-metallic actuator 114 has cooled and warped back to an operative position.

As indicated in the introduction, the signaling arms 28 of the indicators 24 and 25 are normally limited to pivotal movements of approximately 90° between their extreme retracted positions wherein they are parallel to their casings and the side of the vehicle, and their extended operative positions wherein they are at right angles to the vehicle. The signaling arms are, as a matter of fact, mounted for pivotal movements greatly in excess to this normal 90° so that they can be moved in their directions of extension beyond their normal maximum extended positions to positions wherein they are very close to the sides of the vehicle body and project only very slightly beyond the facings of their casings.

Figures 9, 10, 11, 12:
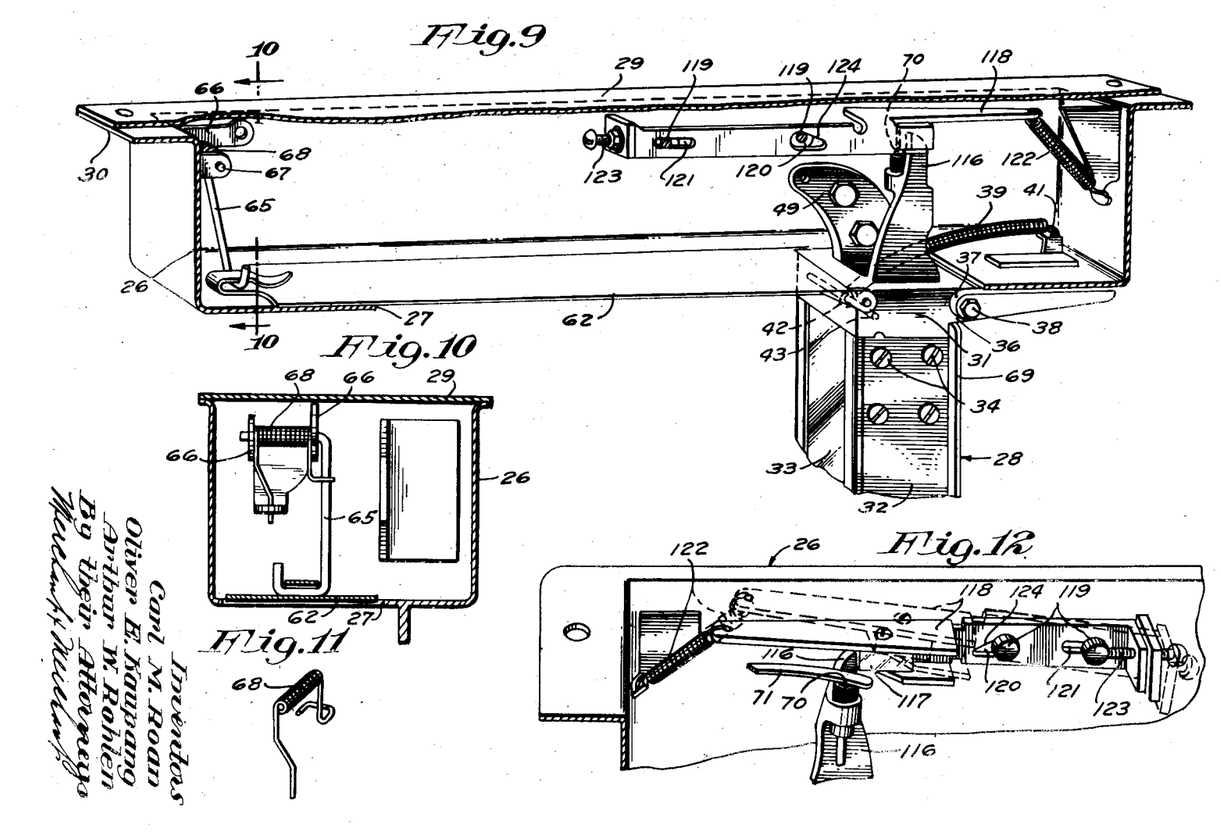
Fig. 9 is a detail sectional view similar to Fig. 7 but showing parts omitted in Fig. 7 and omitting other parts shown in Fig. 7.
Fig. 10 is a sectional view taken in the line 10—10 of Fig. 9.
Fig. 11 is a detail view in perspective of a shutter operating spring otherwise shown in Figs. 9 and 10 particularly.
Fig. 12 is a fragmentary detail view showing certain of the parts of Fig. 9 turned 180° on a vertical axis.

For normally stopping the signal arms when they reach their maximum extended right angle positions with respect to their casings, a yielding stop mechanism, presently to be described, is preferably employed. For co-operation with the stop mechanism, the heel blocks 31 of the signaling arms are provided with inwardly extending stop engaging arms 116 on the intermediate portion of which the switch contacts 70 are mounted. These arms 116 work entirely within the casings, and when the signal arms reach positions of maximum extension 90° outward of their normal retracted positions, the free ends thereof engage stop detents 117. The stop detents 117 are preferably of rubber or other slightly resilient material so as to absorb the shock upon sudden stopping of the signal arms, and are mounted on and project from spring retracted latch bars 118. The latch bars 118 are each secured for limited movements to their respective casing by means of headed guide pins 119 that work in slots 120 and 121 in the latch bar and are anchored fast to the casing. The slot 121 is disposed substantially longitudinally of the casing and has parallel sides, whereas the slot 120 is V-shaped or triangular, as best shown in Figs. 9 and 12. The projecting free end of the latch bar 118 is subject to the yielding tension of a spring 122 to retract to its normal position shown by full lines in Figs. 9 and 12, in which position the stop lug 117 is positioned in the path of movement of the stop engaging arm 116. Not only does the spring 122 tend to pull the latch bar 118 in the direction of the stop engaging arm 116, but also tends to move the same pivotally on the pin 119 toward the axis 38 of the signal arm to the limits of the slots 120 and 121. However, by reference to Figs. 9 and 12 particularly, it will be seen that stop screws 123 are provided in the ends of the latch bars 118 opposite the spring 122 for engagement with their respective adjacent pins 119. By means of screws 123 the latch bars and their stop lugs 117 can be positioned to stop the signal arm at exactly the desired point, usually before the pins 119 engage the ends of their slots. The tension of the springs 122 is sufficient to retain the latch bars and their stop lugs 117 against sliding or pivotal movement under all normally encountered forces. However, under application of excessive pressure such as might be encountered by the signal arms being struck by a passing vehicle, or stationary object, or any extraneous force, the spring 122 will yield and permit the latch bar to partake of compound longitudinal and pivotal movement from the position shown by full lines in Fig. 12 to the position shown by dotted lines in Fig. 12, at which point the latch lug 117 will have moved out of the path of travel of the free end of tip of the arm 116; and will permit the signal arm to pass, for example, from its normal position shown by full lines in Fig. 3 to an abnormal position such as shown by dotted lines in Fig. 3, or even further toward position of alignment with the signal arm casing in the direction of extension.

This compound pivotal and longitudinal movement is caused by virtue of the fact that the slot 120 is V-shaped and has a surface 124 which acts as a cam surface against its co-operating pin 119 that causes the latch bar to move pivotally on the other latch pin 119 while partaking of longitudinal movement thereon.

Figures 3, 17, 18:
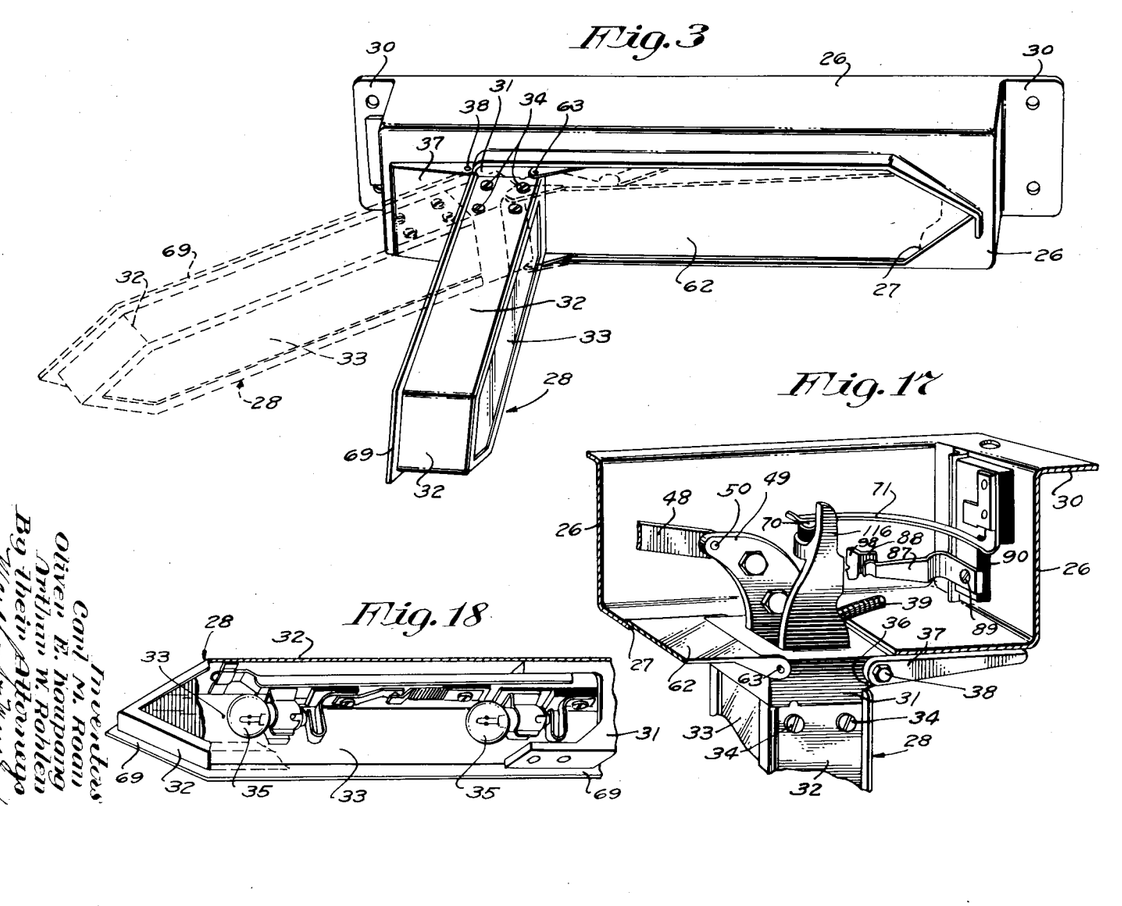
Fig. 3 is a perspective view of one of the complete indicators.
Fig. 17 is a fragmentary view sectioned similarly to Figs. 7 and 9 but omitting some of the parts illustrated in the other figure and showing certain details omitted in Fig. 7.
Fig. 18 is a perspective view with some parts broken away of a signal arm of one of the indicators.
Figure 4:
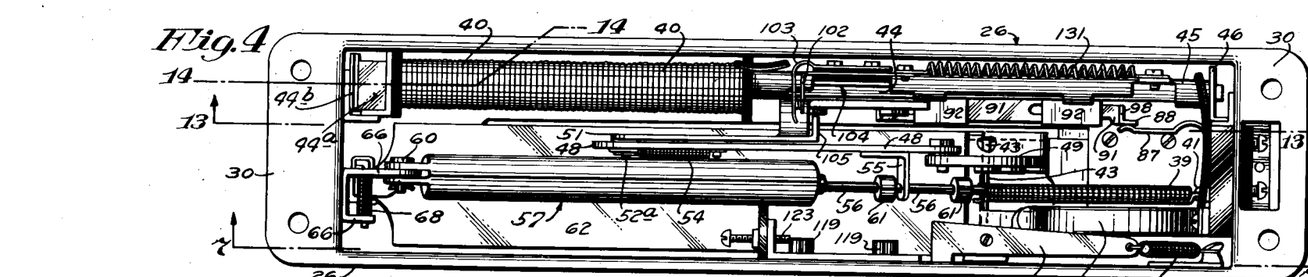
Fig. 4 is a view in side elevation of one of the indicators and represents what would be seen were the device of Fig. 3 rotated 180° on a vertical axis while the signal arm was extended as shown by full lines in Fig. 3.
Figure 5:
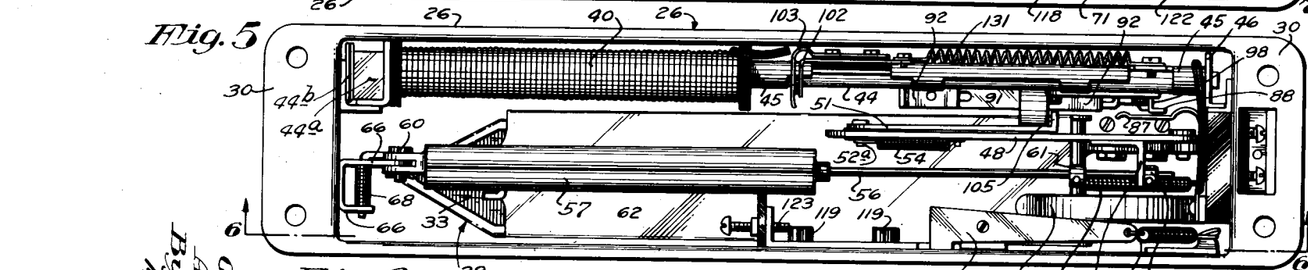
Fig. 5 is a view similar to Fig. 4 but showing the parts in a position assumed when the signal arm is retracted within the casing.
Figure 6:
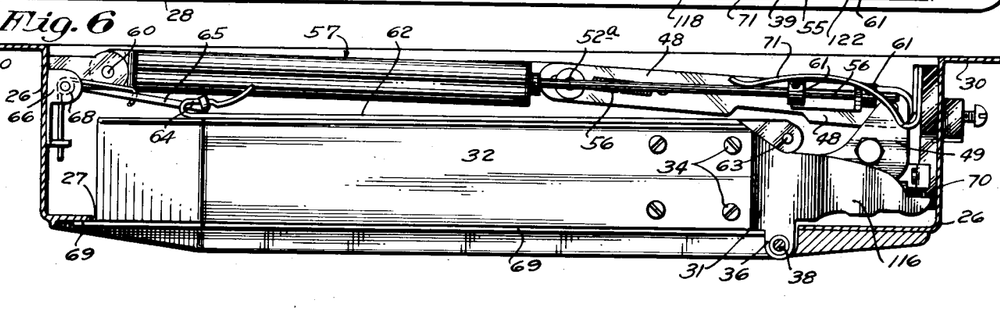
Fig. 6 is a sectional view taken approximately on the line 6—6 of Fig. 5.

In the structure designed as herein illustrated, the lug 49 of the signal arm heel block will come into engagement with the signal aperture shutter 62 when the signal arm is forced to approximately the position shown by dotted lines in Fig. 3, which is usually sufficient to clear the obstruction producing the excessive movement of the signal arm, but it is important in connection with the invention that the shutter 62 is preferably made of resilient sheet metal which will, when engaged with the end of the lug 49, yield and bulge outwardly to permit continued forced pivotal movement of the signal arm and will, when relieved of excessive pressure, spring back to its normal condition. After the signal arm has been forced to its abnormal position as indicated by dotted lines in Fig. 3, it is necessary to manually move the same back to a position where the tip of the arm 116 drops again behind the stop lug 117, and in this connection it will be noted that one side of the tip end of arm 116 is rounded so that it will cam the lug 117 and bar 118 upwardly during its return movement to normal position.

*Operation*

When the signaling devices 24 and 25 are in their inoperative conditions with their signal arms retracted, the parts thereof and their switch mechanisms will be positioned as shown diagrammatically to the left of the broken line x—x of Fig. 22, and as shown also in Figs. 1, 5, 6 and 21. When the operator desires to give a right hand turn indication, for example, he will move the right hand control element 91 from its upper dotted position of Fig. 19 to the lower full line position of Fig. 19, thereby moving the switch arm 79 of the switch 75 from its inoperative dotted line position of Fig. 22 to its full line operative position of Fig. 22. This manual manipulation of the switch 75 through the medium of its respective control element 81 will result in the closing of the high power or low resistance circuit through the signal arm projecting solenoid 40 of the right hand turn indicator, which comprises: a lead 125 from one side of the vehicle's storage battery B through the switch arm 108, switch contacts 107, bi-metallic latch actuator 114, a lead 126 through switch arm 79 of switch 75 and its now engaged fixed contact 78, a lead 127 through the solenoid coil 40 of the right hand turn indicator 25, a lead 128 through the normally closed contacts 102 and 103 of switch 101 and back to the opposite side of the battery B through a lead 129 and metallic parts of the vehicle to which said lead 129 and the said opposite side of the battery B are grounded.

As a result of this closing of the high power circuit and the resultant energization of the solenoid 40, the signal arm 28 of the right hand turn indicator will move approximately 90° pivotally to its normally extended operative position shown by dotted lines at the right in Fig. 22, at the right in Fig. 2 and by full lines in Figs. 3, 9 and 17.

Under initial projecting movements of the signal arm, the switch arm heel contact 70 will come into wiping engagement with the segmental spring contact 71 which will result in automatically establishing a circuit through light bulbs 35 of switch arm comprising: a lead 125, switch arm 108, contacts 107, bi-metallic latch actuator 114, lead 126, switch arm 79, contact 78 of switch 75, lead 127, lead 130, segmental spring contact 71 and its switch arm heel contact 70, lead 72, the light bulbs 35 and ground connections completing the circuit back to the opposite side of the battery B.

This circuit will remain closed and the light bulbs 35 will remain illuminated so long as the signal arm is projected and until the signal arm is retracted back to a substantially completely closed position. During this time the inner of the light bulbs will burn steadily, whereas the outer thereof will flash on and off intermittently under automatic control of the flasher switch 73 in series therewith.

Under final projecting movement of the signal arm, the spring contact 103 of the switch 101 will be engaged by the armature carried lug or flange 105 and moved to the position shown at the right in Fig. 22 wherein the contacts 101 and 102 will be opened. When these contacts are open the solenoid energizing current, in place of flowing through lead 129 directly to ground and back to the other side of the storage battery, will now flow to ground and back to the battery through the medium of a series resistance 131 which constitutes part of the so-called high resistance or low power circuit. When the resistance 131 is thus rendered operative, the total amount of power dissipated will be greatly reduced and will, in fact, be just sufficient to insure the retaining of the signal arm in its extended position against ordinarily encountered forces tending to close the same, such, for example, as wind and vibration. In fact, the amount of power dissipated through this lower power high resistance circuit will not be great enough to produce undue drain on the battery under relatively long periods of operation, nor will it be sufficient to produce undue heating of the circuit elements, including the solenoid 40 and bi-metallic switch actuator 114. As previously pointed out, however, in case the signal arm of the high power circuit should fail to project, the switch 103 would not automatically break the circuit with the result that the bi-metallic latch actuator 114 would, within a predetermined relatively short interval, become heated to the point where it would warp the latch hook 113 out of engagement with the latch element 112 and permit opening of the overload cut out switch 106. This opening of the switch would occur before serious drain had been produced on the vehicle's battery and before other elements of the circuit had been heated to the danger point. However, the prolonged operation of the low power circuit will not be sufficient to cause opening of the overload cut out switch 106.

Also, under final projecting movements of the signal arm 28 of the right hand turn indicator, switch contacts 87 and 88 will be brought into electrical engagement which will result in the closing of the circuit through pilot light bulb 84 of the right hand turn indicator. This last circuit comprises in addition to leads 125 and 126 and the interposed switch 106, leads 132 and 133, contacts 87 and 88, element 91 and ground connections back to the other side of the storage battery B. Since the pilot light bulb becomes illuminated only after the signal arm has become substantially fully projected, the failure of the same to illuminate instantly in response to the manipulation of the switch 75 in an operative direction, will indicate to the operator a faulty condition of the mechanism.

The signal arm will now remain projected so long as the manual control switch 75 remains in its operative position shown by full lines in Fig. 22. Now when it is desired to retract the signal arm, the operator merely returns the switch actuator to its normal upper position which will result in the breaking of all of the circuits except that of the pilot light bulb 84. The signal arm and its operating connections will now be returned to their normal retracted positions under the yielding action of the spring 39. The circuit of the pilot light bulb 84 will remain closed until the signal arm reaches a nearly fully retracted position, at which time the switch contacts 87 and 88 will be broken in the manner earlier described. The operator will, of course, be assured that when the pilot light bulb 84 goes out that the signal arm has been successfully retracted.

When the operator desires to give a left hand turn indication, he will move the left hand control element 81 from its full line upper position of Fig. 19 to its lower dotted line position of Fig. 19, which will result in the closing of the switch arm 79 with fixed contacts 78 of switch 74, which will, in turn, result in closing of the circuits and functioning of the left hand turn indicator 24 in exactly the same manner as was described in connection with the right hand indicator 25. Since all of the circuits and functions of the left hand turn indicator mechanism are identical to those of the right hand turn indicator mechanism, a detailed description of the circuit elements and functions would be considered a repetition and hence will be omitted.

It is obvious that the automatic cut out switch 106 is common to both the left and right hand turn indicators. Of course, if the operator desires to temporarily block the highway for some reason or the other such as would be desirable in case an emergency causing him to get out of his own traffic lane occurred or for any other reason, he will simply operate both of the control elements 81 thereby causing simultaneous projecting of both the left and right hand turn indicators, as shown particularly in Fig. 2.

As previously pointed out, the control elements 81 of the left and right hand turn indicators are so located, spaced and otherwise arranged that they may be operated one by the little finger of one of the operator's hands and the other by the thumb of the same hand. Preferably the control box 76 will be located within convenient reach of the operator's right hand so that when his little finger comes into operative engagement with the finger-engaging portion of the right hand control element, the thumb of his hand will be positioned for operation of the left hand control element 81.

As earlier indicated, a very important feature of the instant invention is the provision of means to aid the operator in quickly locating and positively identifying the control elements 81, and determining the respective operative and inoperative positions of the control elements. In accordance with the illustration of Figs. 19 and 20, this end is accomplished by the provision of a locator ledge or shelf 134 that is mounted on and projects outwardly from the instrument panel 77. This locator ledge or shelf is preferably, and as illustrated, horizontally disposed and is laterally centered with respect to but located in a plane above the range of movement of the control elements 81, and is preferably wide enough to receive at least three of the operator's fingers. When the operator desires to give an indication, he merely reaches out his hand and locates his fingers upon this locator shelf under downward movement, and then by dropping his little finger and thumb below the shelf, they each come into contact with the proper control element. Not only does this definitely establish the identities of the opposite control elements 81, but by the relative distances of the finger-engaging portions of each thereof from the locator shelf, the operative and inoperative positions thereof are very readily established.

In Fig. 21 substantially this same end is accomplished by placing the control box on the face of the control panel 77 so as to utilize the upper horizontal edge 134a thereof as the locator ledge or shelf. This somewhat simplifies the construction and cost of installation.

In Figs. 19 to 21 inclusive, several different conditions of the switch operating levers or control elements are illustrated, and by dotted lines in these figures the relative positions of the operator's fingers are illustrated.

Figure 7:
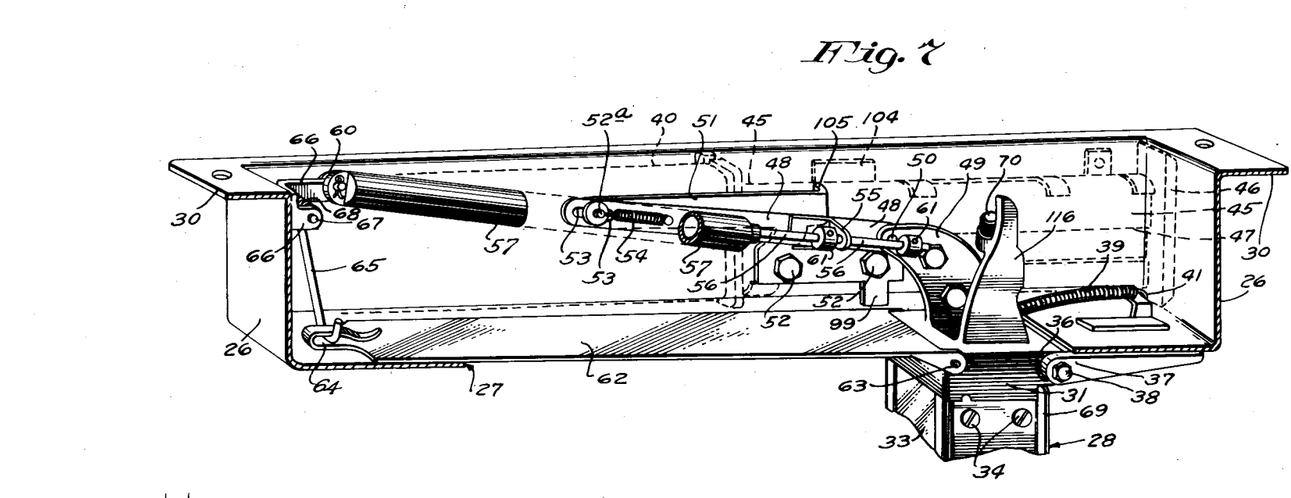
Fig. 7 is a detailed view taken approximately on the line 7—7 of Fig. 4 and shown in perspective, some parts being broken away, some parts being omitted and some parts being shown in dotted lines.
Figure 8:
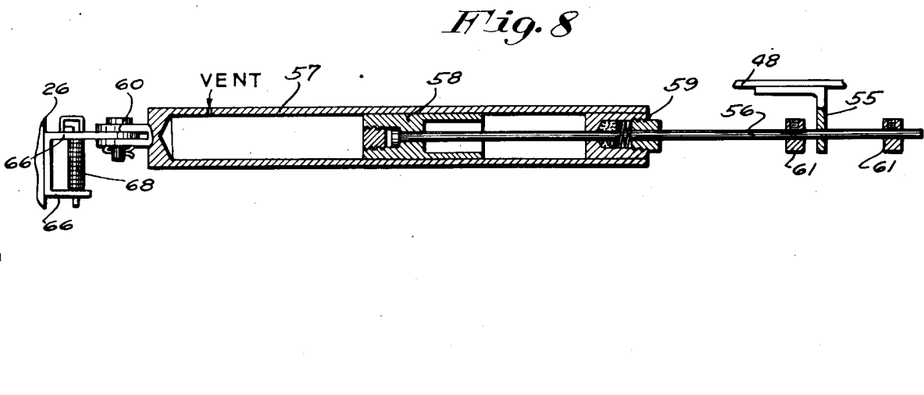
Fig. 8 is an enlarged detail sectional view illustrating the details of the dash pot and its hook-up.

This spring 54 tends to hold the pin 52a drawn tightly against the right hand end, in respect to Fig. 7, of the slot 53 and does do this when the signal arm is retracted and through the major portion of the signal arm extending cycle. However, the maximum movement of the armature bar 44 in the signal arm extending direction is somewhat greater than is required to move the signal arm to the normal limit provided by the before described yielding stop, so that after the signal arm comes to a stop by engagement with the yielding stop element 117, the armature bar 44, push arm 51 and pin 52a will continue to travel slightly against the yielding action of spring 54 and will come to rest when the pin 52a is in the intermediate portion of the slot 53, as shown in Fig. 7. This action is highly important for three reasons, to wit:

(A) In the first place the switches 101 are not opened to make the transfer from the high power to the low power circuit until just after the signal arm has been fully projected so that the full power is used to fully extend the signal arm, and then the transfer to the low power circuit made after extension of the signal arm and under the slight further movement of the armature bar near the extreme of its extending movement. In this particular connection it should be noted that maximum signal arm extending movements of the armature bars 44 are limited by engagement of one end thereof with a magnetically influenceable abutment 44a adjacent the ends of the solenoid coils 40. When the ends of the armature bars come close to their respective abutments, there is a strong magnetic field set up therebetween which complements the direct magnetic pull resulting from the relation of each armature bar to its solenoid, and increases the overall pull for a given consumption. This complementary magnetic force is highly effective at the time the transfer is made from the high power to the low power circuit so that even under this reduced power continued movement of the armature bars is insured and retaining of the same against the abutments is insured. Obviously were it not for such slack motion or yielding action in the connections as is permitted by movement of the pin 52a in the slot 53, this transfer from the high power to the low power circuit would have to be made substantially in exact coincidence with the signal arm reaching its normal extended position, which would require delicate and hard to maintain adjustments.

(B) The slot and pin connection is also important for the reason that it affords a yielding link in the signal arm operating connections which will permit forced movements of the signal arms beyond points of engagement with the yielding stops without damage to the operating mechanism. When the signal arms are forced by the yielding stops 117, the pins 52a, being in the intermediate portions of the slots, will permit further movement of the signal arms in an extending direction and the arrangement is such that the signal arms can be moved beyond their stops to positions parallel to their casings without moving the pins 52a into engagement with the ends of their respective slots.

(C) The yielding linkage described is important in that, in case the signal arms become stuck closed by sleet or the like, the springs 54 will yield under strain of magnetic pull and permit the pins to travel to the left, in respect to Fig. 7, until they come into engagement with the left hand ends of the slots 53, at which time an abrupt jar or hammering action will be produced, as a result of slack motion, and this will momentarily multiply the force and will usually break the signal arms loose.

The abutments 44a are preferably and as illustrated in the nature of floating members that are yieldingly held in place against the ends of the guide sleeve 45 by leaf-spring 44b, which serve in the capacity of shock absorbers when the armature bars reach the limits of their outward movement.

What we claim is:

1. In a signaling mechanism for vehicles, a mounting member adapted for application to the side wall of a vehicle, a signal arm pivotally mounted on said mounting member for angular movements materially in excess to 90°, means for moving the signal arm pivotally from an operative to an inoperative position and means including a yielding stop for normally limiting movements of the signal arm to approximately 90°, said yielding stop means being operative to determine the maximum movement of the signal arm in an operative direction under all normal conditions but operating to yield under abnormally excessive opening pressure less than would be required to break the mechanism.

2. A signal mechanism for vehicles comprising a mounting member adapted to be mounted on a vehicle body parallel to a side wall thereof, a signal arm pivotally mounted on the mounting member for pivotal movements from a normally inoperative position substantially parallel to the mounting member to an angular position representing materially in excess to 90° of pivotal movement, yielding stop means operatively engaging the signal arm when the same has been moved to a position approximately at right angles to the mounting member, said yielding stop being sufficiently strong to resist normally encountered forces tending to move the signal arm beyond a position of engagement with the yielding stop, but having less resistance to pivotal movements of the signal arm than will be required to damage the signal arm or operating mechanism.

3. A vehicle signal comprising a casing adapted to be mounted parallel to a side wall of a vehicle body and having an open outer face, a signal arm pivotally mounted to the casing adjacent one end thereof for pivotal movements from a retracted inoperative position within the casing to an extended operative position representing materially in excess to 90° of pivotal movement, power operated mechanism for extending and retracting the signal arm, said power operated mechanism tending to move the signal arm more than 90° in an operative direction, yielding stop means operatively engaging the signal arm when it reaches a predetermined maximum desired extended position, said yielding stop means having sufficient resistance to overcome the combined pressure of the power operating mechanism and other normally encountered forces tending to extend the signal arm past a point of engagement with the yielding stop but having a smaller degree of resistance to pivotal extending movements of the signal arm then is required to damage the signal arm or its operating mechanism under accidental application of abnormally excessive extending pressure.

4. The structure defined in claim 3 in which the signal arm is provided with a stop lug that projects laterally from its axis and in which the said yielding stop comprises a stop detent mounted for limited movements into and out of the path of rotary movement of said stop lug, and yielding means normally maintaining the stop detent in one extreme position wherein it is in the path of movement of the stop lug.

5. In a vehicle signal, a casing adapted to be mounted on and parallel to a side wall of a vehicle body and having an open outer face, a signal arm pivotally mounted on a casing adjacent one end thereof for pivotal movements from a retracted inoperative position within the casing to an extended operative position representing materially in excess to 90° of pivotal movement, power operated mechanism for extending and retracting the signal arm, yielding stop means operatively engaging the signal arm when it reaches a predetermined maximum desired extended position, said yielding stop means having sufficient resistance to overcome the normally encountered opening force of the signal arm but having less resistance to pivotal extending movements of the signal arm than is required to damage the signal arm or its operating mechanism under accidental application of the abnormally excessive extending pressure.

6. The structure defined in claim 5 in which the signal arm is provided with a stop lug that projects laterally from its axis and in which the said yielding stop comprises a stop detent mounted for limited movements into and out of the path of rotary movement of said stop lug, and yielding means normally maintaining the stop detent in one extreme position wherein it is in the path of movement of the stop lug.

7. The structure defined in claim 5 in which the said power operated mechanism includes a motor operated element mounted for sliding movements under the influence of the motor longitudinally of the casing, and operating connections between the sliding element and signal arm whereby movements of the sliding element in one direction under influence of the motor will move the signal arm from its inoperative to its operative position, said operating connections including a yielding link permitting movement of the signal arm beyond the yielding stop independently of the motor operated sliding element.

CARL M. ROAN.
OLIVER E. KAUPANG.
ARTHUR W. ROHLEN.